Figure 1:
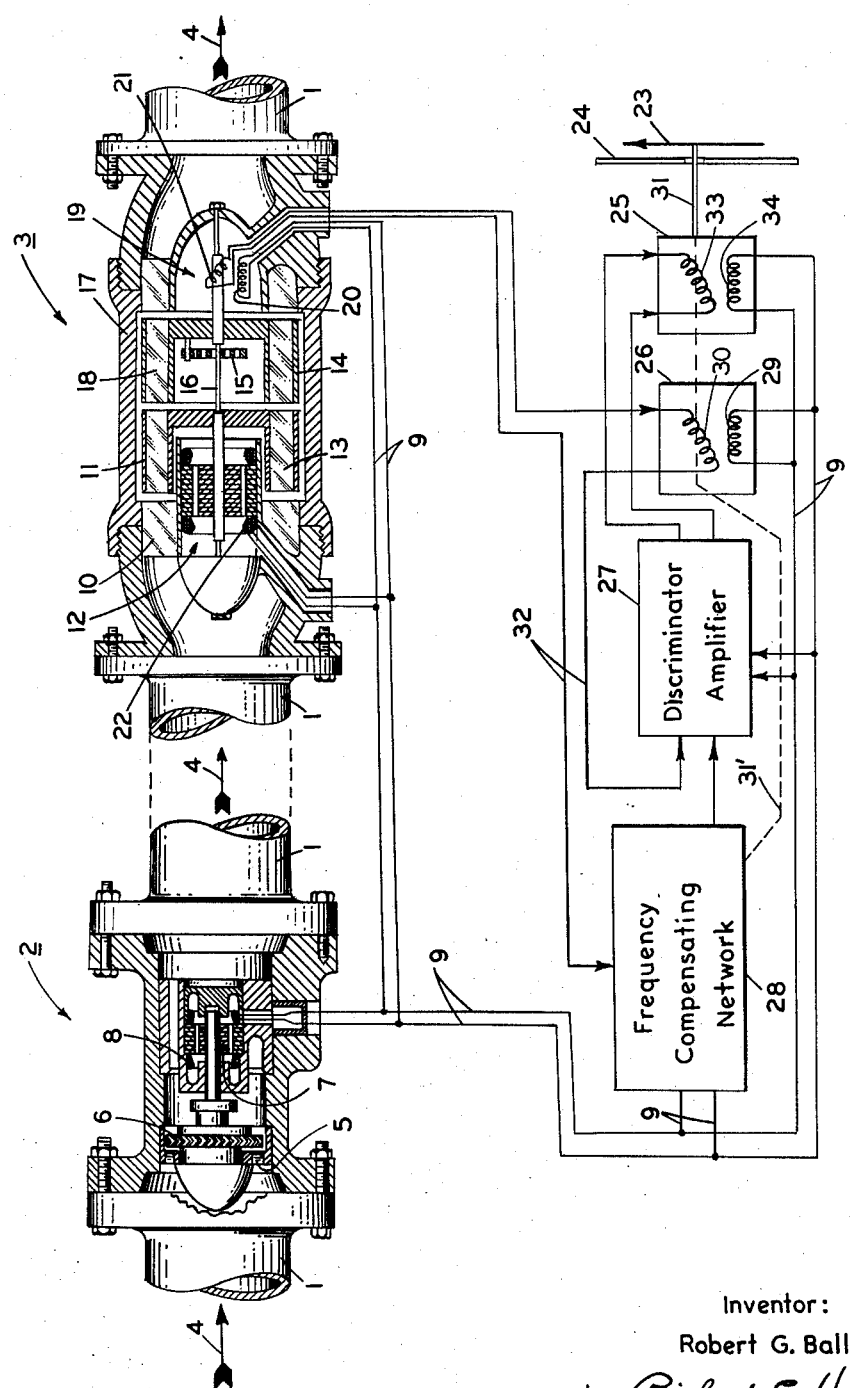

Dec. 1, 1959  R. G. BALLARD  2,914,944
FREQUENCY-COMPENSATED FLOWMETER SYSTEM
Filed June 12, 1956  2 Sheets-Sheet 1

Inventor:
Robert G. Ballard
by Richard E. Horley
His Attorney

Dec. 1, 1959     R. G. BALLARD     2,914,944
FREQUENCY-COMPENSATED FLOWMETER SYSTEM
Filed June 12, 1956     2 Sheets-Sheet 2
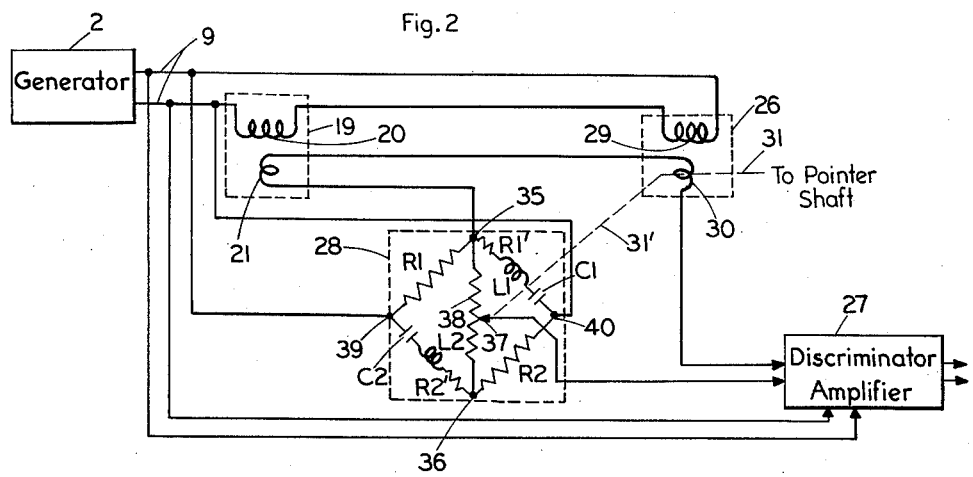
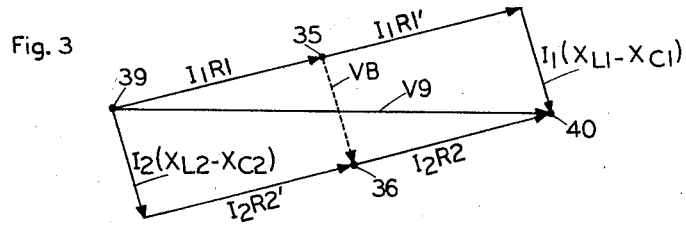
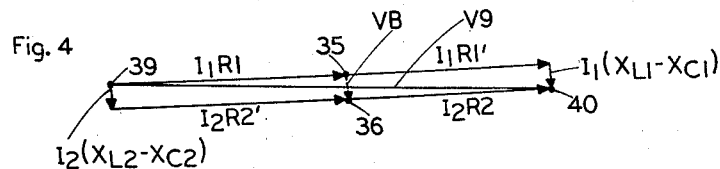
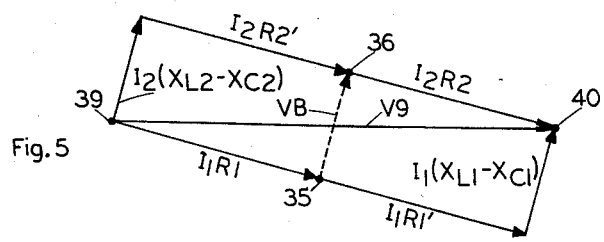
Inventor:
Robert G. Ballard
by Richard E. Hosley
His Attorney

United States Patent Office 2,914,944
Patented Dec. 1, 1959

2,914,944

FREQUENCY-COMPENSATED FLOWMETER SYSTEM

Robert G. Ballard, Saugus, Mass., assignor to General Electric Company, a corporation of New York Application June 12, 1956, Serial No. 590,850

8 Claims. (Cl. 73—194)

The present invention relates to mass flowmeters and, more particularly, to mass flowmeter systems wherein deleterious effects of frequency variations in power supplies are nullified.

Accurate measurement and control of fluid flow with reference to mass, as distinguished from volume, may be performed advantageously with apparatus wherein angular momentum phenomena are involved. In such apparatus, all of the measured fluid is accelerated to a uniform linear speed about a given axis by a fluid impeller which is rotated about that axis at a constant speed. And, measurements representative of the power required for such acceleration or representative of the power lost in predetermined deceleration of the fluid after it has been so accelerated are indicative of the mass flow characteristics. However, accuracies may be impaired if the impeller speed of rotation is permitted to vary, and when synchronous electric impeller motors have been employed, it has also been necessary to provide associated power supplies having closely regulated output frequencies. In practice of the present teachings, such synchronous impeller motors are likewise utilized, although the requirement for precisely regulated power supplies is relaxed or obviated.

Accordingly, it is one of the objects of the present invention to provide improved mass flow measurement apparatus of the angular momentum type wherein effects of impeller speed variations are compensated automatically.

A further object is to provide a mass flow measuring system powered by the electrical output of a turbo generator driven by the fluid under measurement and compensated for frequency errors in the generator output.

By way of a summary account of the invention in one of its aspects, a fluid flow path to be investigated is provided with both a turbine-generator and an angular-momentum mass flowmeter. Fluid impinging upon the generator turbine wheel causes it to turn the generator rotor and to induce output signals of frequencies related to the turbine wheel speeds, and these output signals are employed to excite the synchronous motor of a mass flowmeter impeller which then also rotates at speeds related to these frequencies. Fluid which has been accelerated by the flowmeter impeller is caused to react with a restrained flowmeter turbine, in a known manner, and the angular deflections of the turbine are measured to characterize the instantaneous mass rate of flow values. However, because of the aforesaid frequency and impeller speed variations with varying fluid flow, these measurements tend to be erroneous, with the deflections being less than the proper values at low frequencies and greater at high frequencies. Rather than indicating these erroneous turbine deflections directly, they are converted into electrical signals and compared with signals representative of orientations of a servo-driven pointer shaft. Difference signals are applied to a compensating network of reactances which automatically factor in corrections for both frequency errors and the existing mass flow rate, and the resultant signal is delivered to a servo amplifier from whence excitation is provided for the servo motor driving the pointer shaft.

The subject matter regarded as my invention is particularly pointed out and distinctly claimed in the concluding portion of this specification. However, both as to organization and mode of operation, and further in relation to objects and advantages thereof, this invention may best be understood through reference to the following description taken in connection with the accompanyings, in which:

Figure 1 provides a diagram of a mass flowmeter system in which the present teachings of compensation are practiced;

Figure 2 presents a detailed schematic diagram of a frequency compensating network such as that included in the system of Figure 1; and Figures 3, 4, and 5 are vector diagrams of operation of the network of Figure 2 at frequencies of 55, 59, and 65 cycles per second, respectively.

The embodying system in Figure 1 is that of a self-powered mass flow measuring system such as finds application in remote portions of a gaseous fluid line inaccessible to commercial electrical supply facilities. In the flow conduit 1 there are disposed serially a turbo-generator 2 and mass flow detector 3, the latter being electrically excited by the turbo-generator output. Fluid coursing through conduit 1 in the direction of arrows 4 first encounters a fixed annular set of skewed vanes 5 in the upstream portion of the turbo-generator 2, and after being deflected into angular travel by these vanes, next impinges upon the buckets of a rotatable turbine wheel 6. As the turbine wheel 6 is rotated at a high speed by this fluid motive action, it turns the attached permanently-magnetized generator rotor 7 and causes the magnetic field thereof to intercept and induce output signals in the generator stator windings 8. Alternating current signals of frequency depending upon the turbine wheel speed, and thus also depending upon the fluid flow, are delivered by the stator winding output leads 9.

Downstream in relation to the turbo-generator the mass flow characteristics of the fluid are sensed by the flowmeter detector 3, which is of the axial-flow type such as is disclosed in U. S. Patent 2,714,310 for "Mass Rate Flowmeter" assigned to the same assignee as that of the present application. Upon passing the annular array of upstream straightening vanes 10 in this flowmeter, the fluid enters the longitudinal peripheral passages of a generally cylindrical impeller 11 which is rotated by a synchronous motor 12. In these passages, which are separated by partitions 13, all of the fluid is accelerated to a substantially uniform linear speed (angular speed X radius) and thus possesses an angular momentum related to its mass. Subsequently, the fluid is decelerated in a turbine 14 having a construction like that of impeller 11 except that it is resiliently restrained from angular movement by a spiral spring 15 which is mounted between it and the shaft 16 fixed with the stationary outer housing 17. As the fluid accelerated by the impeller impinges upon the turbine partitions 18 between its flow passages, angular momentum is released to the turbine and it deflects against the force of restraining spring 15 by amounts depending upon the instantaneous mass rate of fluid flow. This angular deflection from a zero flow position is detected by and characterized in the electrical output signal of a pick-off or transmitter 19 which, in the interest of simplicity and clarity is schematically portrayed in the fixed stator winding 20 and the movable turbine-mounted rotor winding 21. Transmitter 19 is of a common type producing A.-C. electrical signals varying in amplitude with angular displacements between its rotor and stator. Both the stator excitation winding 20 of transmitter 19 and the stator winding 22 of the synchronous impeller motor 12 are energized by the frequency-variable output of turbo-generator 2, whereby it follows that the frequency of output signals from transmitter 19 and the speed of rotation of impeller 11 vary slightly with the changes in turbo-generator output frequency. It should be apparent that as the impeller speed varies somewhat in this manner, the turbine deflections, and hence the transmitter output signals, can also vary, even though the mass rate of fluid flow remains the same. This error is thus related to the frequency deviations in the generator output, but it is important to note that it is also related to the instantaneous mass rate of fluid flow. For example, with zero flow, it matters not what the impeller speed may be, because the turbine will not deflect at all under that flow condition. As the mass flow rate increases from zero flow to a low value at which only a small turbine angular deflection could result, then the absolute value of the aforesaid error due to frequency deviations is likewise small. At maximum mass flow, however, the absolute value of this error in turbine deflection or flowmeter output signal is considerably greater. Evaluations have demonstrated that the absolute values of the error which should be compensated vary in a somewhat linear manner from zero to maximum mass flow rate. Accordingly, it is not sufficient to introduce corrections proportioned to frequency alone, and through practice of my teachings, both factors are automatically and uniquely brought into play.

Thus, it is that my system depicted in Figure 1 further includes a remote servo-driven pointer 23 cooperating with a dial 24, an electrical servo motor 25 actuating the pointer, an electrical pick-off or repeater 26 movable with the pointer and servo motor, an amplifier 27 energizing the servo motor, and a frequency compensating network 28 responding to the generator output and to the pointer position and to signals from transmitter 19 and repeater 26. The repeater or electrical pick-off 26 is of a construction and possesses a mode of operation like the flowmeter pick-off 19. Its stator winding 29 is excited by the same frequency variable source appearing in leads 9, and its rotor winding 30, which moves angularly with pointer shaft 31, produces output signals characterizing the angular orientations of the rotor shaft relative to a zero flow indication position. Pick-off rotor windings 21 and 30 are coupled in series opposition, such that the difference signals are applied to amplifier 27 through network 28 via leads 32. When the pointer shaft 31 is in angular correspondence with orientations of the flowmeter turbine shaft 16, then these difference signals are reduced to zero, of course, but at other times their difference signals will be of one or an opposite phase and of amplitudes proportional to the lack of angular correspondence. As is customary with pick-off units of this type and circuit interconnection, their output vs. angular deflection characteristics are made the same, preferably linear, and exactness of electrical phasing is achieved with the aid of the usual capacitors, not illustrated.

Network 28, which is described more fully hereinafter, responds to the frequency of the excitation from leads 9, and also to a compensating or regulating effect brought about by mechanical movement of pointer shaft 31. Dashed-line 31' indicates the control by the pointer shaft 31. Through this network which acts as a signal generator, a resultant fully-compensated control signal is applied to the discriminator-amplifier 27, which is of the common type yielding a power-amplified output of one or an opposite phase depending upon the phase of the applied control signal. This amplified output energizes the rotor winding 33 of servo motor 25 such that it rotates pointer shaft 31 upon interaction with the field from the motor stator winding 34. Pointer 23 thus continuously follows the angular movements of the flowmeter turbine and indicates the measured mass rate of flow.

In Figure 2 the elements of compensating network 28 are detailed. The circuitry there functions both as a frequency bridge, with the full bridge output signal appearing across terminals 35 and 36, and as a special voltage divider, with the further-compensated net output signal appearing between bridge terminal 35 and the variable tap 37 of the resistance 38 coupled across the bridge terminals. Excitation from the frequency-variable source 2 is applied to the bridge across the remaining terminals 39 and 40. One of the bridge legs includes the inductance L1 and the capacitance C1, which are series-tuned to the frequency sought to be held by the generator 2, such as 60 cycles per second. In the opposite bridge leg are a corresponding inductance L2 and capacitance C2 which are likewise series-tuned to the same frequency. The remaining bridge impedances are resistive in character. Vector diagrams appearing in Figures 3, 4, and 5 show the voltage amplitude and phase relationships appearing throughout the bridge at applied generator frequencies of 55, 59 and 65 cycles per second, respectively. Referring to Figure 3, for example, it is perceived that at 55 cycles the generator voltage V9 applied across network terminals 39 and 40 results in a current I1 flowing through impedances R1, R1', L1, and C1 to occasion the indicated voltage drops I1R1, I1R1', and I1($X_{L1}$—$X_{C1}$). In the opposite bridge path the voltage drops occasioned by the current I2 are I2($X_{L2}$—$X_{C2}$), I2R2', and I2R2. Bridge output voltages appearing across terminals 35 and 36 are represented by the dashed-line vector VB. At 59 cycles, the bridge output voltage VB is shown in Figure 4 as approaching zero. And, in Figure 5, for the condition at 65 cycles, the bridge output voltage VB is of an opposite phase though like magnitude to that appearing at 55 cycles.

The network output signal is not that between points 35 and 36 under all conditions but, instead, is that between point 35 and the variable tap position 37 along the resistance 38. As was stated earlier, no correction or compensation is desired or required at the condition of zero flow through flowmeter detector 3, hence tap 37 should then be at the same potential as bridge terminal 35. On the other hand, at maximum flow, the tap 37 should be brought to near the maximum potential at terminal 36, with the tap being moved along the regulating resistance 38 in a substantially linear manner as measured flow increases from zero to a maximum. Movement of the tap 37 in this desired manner is conveniently accomplished by mechanical coupling thereof with the servo-driven output pointer shaft 31', there being ample torques from that shaft to actuate the potentiometer tap without detracting from system accuracy and speed of response.

As the generator output frequency falls below a predetermined value, such as 60 cycles per second, the synchronous motor driving the flowmeter impeller rotates more slowly and the sensing turbine deflects less for the same mass rate of flow. The voltage pick-off sensing this deflection then yields a smaller output, and, were this directly telemetered to an indicator, the reading would be lower than the true value. Instead, the position of the indicator shaft as sensed by its associated pick-off is compared with the flowmeter pick-off signal and to their difference is added the compensating signal which is of phase and amplitude characterizing the lowered frequency from the generator. The compensated signal is thus increased to make up for the drop in output from the flowmeter detector. Through the discriminator-amplifier, this compensated signal controls the servo motor such that it maintains the indicator or pointer shaft at the position where it preserves the correct high reading. Opposite effects appear when the generator output frequency increases. When it also occurs that the mass rate of fluid flow changes in one or another sense, then the compensating network potentiometer is also reset by the indicator shaft movement, yielding a greater output signal for increased flow and decreased output signal for decreased flow. The two compensations, for frequency and mass rate of flow, are interdependent for reasons already expressed, and the system operates accurately while the mass flow rate and generator frequency are shifting simultaneously.

In certain respects the particular preferred embodiments here illustrated and described may be altered. For example, signal generators of forms other than that of the pick-offs shown may be employed, one desirable unit of a known type including excitation and output windings both mounted on a stator core and cooperating with an unwound rotor structure made of magnetic material. The frequency-compensating network may of course include tuned elements in different circuit relationships, also. Thus, it should be apparent that the specific features herein disclosed are of a descriptive rather than a limiting nature, and that various changes, combinations, substitutions, or modifications may be employed in accordance with these teachings without departing either in spirit or scope from this invention in its broader aspects.

What I claim as new and desire to secure by Letters Patent of the United States is:

1. Flow measuring apparatus comprising a mass flow detector having a rotatable impeller for accelerating all of a flowing fluid to predetermined linear speeds about an axis and a fluid-reaction turbine movable about an axis against angular restraint responsive to momentum of fluid accelerated by said impeller, means supplying periodically-varying electric current, a synchronous electric motor energized by said means and rotating said impeller at speeds dependent upon the frequency of said current supplying means, an output shaft for producing a movement in accordance with the mass rate of flow, a servo motor positioning said output shaft, electric signal generating means responsive to movements of said fluid reaction turbine and characterizing lack of correspondence between the positions of said output shaft and the angular orientations of said turbine about said turbine axis, compensating means connected to said current supplying means and responsive to changes in the position of said fluid reaction turbine about its axis producing output signals characterizing both the mass rate of said fluid flow and the deviations of said frequency from a predetermined frequency, and means controlling operation of said servo motor in accordance with the resultant of signals from said signal generating means and said compensating means.

2. Flow measuring apparatus comprising a mass flow detector having a rotatable impeller for accelerating all of a flowing fluid to predetermined linear speeds about an axis and a fluid-reaction turbine movable about an axis against angular restraint responsive to momentum of fluid accelerated by said impeller, means supplying periodically-varying electric current, a synchronous electric motor energized by said means and rotating said impeller at speeds dependent upon the frequency of said current supplying means, an indicator for providing an indication of mass rate of flow, a servo motor positioning said indicator, a first electric signal generator responsive to angular orientations of said turbine about said turbine axis, a second electric signal generator responsive to the positions of said indicator, frequency-sensitive means responsive to frequency of said current supplying means and producing electric output signals characterizing deviations of said frequency from a predetermined frequency, means responsive to the output of said second electrical signal generator regulating the magnitude of said electric output signals in accordance with the mass rate of said fluid flow, and means controlling operation of said servo motor in accordance with the resultant of the regulated output signals and the signals from said first and second signal generators.

3. Flow measuring apparatus comprising a mass flow detector having a rotatable impeller for accelerating all of a flowing fluid to predetermined linear speeds about an axis and a fluid-reaction turbine movable about an axis against angular restraint responsive to momentum of fluid accelerated by said impeller, means supplying periodically-varying electric current, a synchronous electric motor energized by said means and rotating said impeller at speeds dependent upon the frequency of said current supplying means, an output shaft, a servo motor angularly positioning said output shaft, a first electric pick-off energized by said current supplying means and producing output signals of the frequency of said current supplying means and of amplitudes characterizing angular orientations of said turbine about said tubrine axis, a second electric pick-off energized by said current supplying means and producing output signals of the frequency of said current supplying means and of amplitudes characterizing the angular orientations of said output shaft, a compensating electric circuit tuned to a predetermined frequency and excited by said current supplying means to produce output signals of the frequency of said current supplying means and of amplitudes characterizing the differences between said predetermined frequency and the frequencies of said current supplying means, means operated by said output shaft for regulating the amplitude of said output signals from said compensating circuit, and a servo amplifier exciting said servo motor in response to the resultant of said regulated signals from said regulating means and said output signals from said first and second pick-offs.

4. Flow measuring apparatus comprising a mass flow detector having a rotatable impeller for accelerating all of a flowing fluid to predetermined linear speeds about an axis and a fluid-reaction turbine movable about an axis against angular restraint responsive to momentum of fluid accelerated by said impeller, means supplying periodically-varying electric current, a synchronous electric motor energized by said means and rotating said impeller at speeds dependent upon the frequency of said current supplying means, an output shaft, a servo motor angularly positioning said output shaft, a first electric pick-off energized by said current supplying means and producing output signals of the frequency of said current supplying means which characterize angular orientations of said turbine about said turbine axis, a second electric pick-off energized by said current supplying means and producing output signals of the frequency of said current supplying means which characterize the angular orientations of said output shaft, a compensating electric circuit tuned to a predetermined frequency and excited by said current supplying means to produce output signals of the frequency of said current supplying means which characterize the differences between said predetermined frequency and the frequencies of said current supplying means, a potentiometer, means applying said compensating circuit output signals across said potentiometer, means coupling said output shaft with said potentiometer to vary the output signals tapped therefrom between zero and a maximum value in correspondence with orientations of said output shaft representing zero and maximum output of said apparatus, a servo amplifier controlling operation of said servo motor, means coupling said output signals from said first and second pick-offs opposition to provide net output signals characterizing lack of correspondence between said turbine and output shaft orientations, and means applying said net output signals and said output signals tapped from said potentiometer to said servo amplifier as excitation therefor.

5. Flow measuring apparatus comprising a mass flow detector for coupling into a fluid path having a rotatable impeller for accelerating all of a flowing fluid to predetermined linear speeds about an axis and a fluid-reaction turbine movable about an axis against angular restraint responsive to momentum of fluid accelerated by said impeller, a fluid-driven turbine for coupling into said flow path, an alternating current generator rotated by said turbine, a synchronous electric motor energized by said generator and rotating said impeller at speeds dependent upon the frequencies of alternating current from said generator, an output shaft for producing a movement in accordance with the mass rate of flow, means comparing the angular orientations of said output shaft with the angular orientations of said turbine about said turbine axis and producing electrical signals characterizing the compared orientations, a frequency-sensitive compensator excited by said generator and producing an output of electrical signals characterizing differences between a predetermined frequency and said generator frequencies, means responsive to changes in the position of said fluid reaction turbine about its axis regulating said compensator output signals in accordance with the mass rate of flow measured by said detector, and servo motive means driving said output shaft responsive to said electrical signals from said comparing means and to the regulated compensator signals.

6. Flow measuring apparatus comprising a mass flow detector for coupling into a fluid flow path having a rotatable impeller for accelerating all of a flowing fluid to predetermined linear speeds about an axis and a fluid-reaction turbine movable about an axis against angular restraint responsive to momentum of fluid accelerated by said impeller, a fluid-driven turbine for coupling into said flow path, an alternating current generator rotated by said fluid-driven turbine, a synchronous electric motor energized by said generator and rotating said impeller at speeds dependent upon the frequencies of alternating current from said generator, an output shaft, a servo motor positioning said output shaft, electric signal generating means characterizing lack of correspondence between the positions of said output shaft and the angular orientations of said turbine about said fluid-reaction turbine axis, tuned electric circuit means excited by said generator and producing output signals characterizing deviations of frequencies of said generator current from a predetermined frequency, means operated by said output shaft for regulating the magnitude of said output signals from said tuned circuit means, and means exciting said servo motor in response to the resultant of said regulated output from said regulating means and the output from said signal generating means.

7. Flow measuring apparatus comprising a mass flow detector for coupling into a fluid flow path having a rotatable impeller for accelerating all of a flowing fluid to predetermined linear speeds about an axis and a fluid-reaction turbine movable about an axis against angular restraint responsive to momentum of fluid accelerated by said impeller, a fluid-driven turbine for coupling into said flow path, an alternating current generator rotated by said fluid-driven turbine, a synchronous electric motor energized by said generator and rotating said impeller at speeds dependent upon the frequencies of alternating current from said generator, an indicator, a servo motor angularly positioning said indicator, a first electric pick-off energized by said generator and producing output signals of the frequencies of the generator output which characterize angular orientations of said fluid-reaction turbine about said turbine axis, a second electric pick-off energized by said generator and producing output signals of said frequencies which characterize the angular orientations of said indicator, a compensating electric circuit tuned to a predetermined frequency and excited by said generator to produce output signals which characterize the differences between said predetermined frequency and the frequencies of said generator output, a potentiometer, means apply said compensating circuit output signals across said potentiometer, means coupling said indicator with said potentiometer to vary the potentiometer output signals between zero and a maximum value in accordance with angular orientations of said indicator between orientations representing zero and maximum output of said apparatus, a servo amplifier controlling operation of said servo motor, means coupling said pick-offs in opposition to provide net output signals characterizing lack of angular correspondence between said turbine and indicator orientations, and means applying said net output signals and said potentiometer output signals to said servo amplifier as excitation therefor.

8. Flow measuring apparatus comprising a rotatable impeller for accelerating fluid to be measured about an axis, an electric motor adapted to be energized from a source of periodically varying current connected to drive said impeller at a speed variable with the frequency of said current, a sensing member movable about an axis against angular restraint responsive to momentum of fluid accelerated by said impeller to indicate mass rate of flow of said fluid, an indicator, a servo system comprising a control circuit including output connections of electrical transmitter and repeater pick-offs for positioning said indicator relative to a zero flow indicating position in accordance with the position of said sensing member, and compensating means to effect relative displacement between said sensing member and said indicator to compensate for flow indication errors caused by variations of the frequency of said source and the resulting speed variations of said motor, said compensating means comprising an electric signal generator having means varying the output of said signal generator in accordance with deviations in frequency of said source of periodically varying current from a predetermined value, regulating means additionally varying the output of said signal generator in accordance with the displacement of said sensing member from said zero flow position, and means connecting said signal generator to said control circuit whereby said indicator is positioned in accordance with the combined outputs of said transmitter and repeater pick-offs and said electric signal generator.

References Cited in the file of this patent
UNITED STATES PATENTS

| 2,176,101 | Riggs | Oct. 17, 1939 |
| 2,714,310 | Jennings | Aug. 2, 1955 |